(12) United States Patent
Nam et al.

(10) Patent No.: US 9,298,872 B2
(45) Date of Patent: Mar. 29, 2016

(54) APPORTIONING SYNTHESIS EFFORT FOR BETTER TIMING CLOSURE

(71) Applicant: International Business Machines Corporation, Armonk, NY (US)

(72) Inventors: Gi-Joon Nam, Austin, TX (US); Thomas E. Rosser, Austin, TX (US); Manikandan Viswanath, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/185,566

(22) Filed: Feb. 20, 2014

(65) Prior Publication Data

US 2015/0234971 A1    Aug. 20, 2015

(51) Int. Cl.
*G06F 17/50* (2006.01)
*H01L 21/00* (2006.01)

(52) U.S. Cl.
CPC ........ *G06F 17/5072* (2013.01); *G06F 17/5077* (2013.01); *G06F 17/5081* (2013.01); *H01L 21/00* (2013.01); *G06F 2217/84* (2013.01)

(58) Field of Classification Search
CPC .................................................. G06F 17/5072
USPC .......................................................... 716/122
See application file for complete search history.

(56) References Cited

U.S. PATENT DOCUMENTS

| 5,519,627 | A | 5/1996 | Mahmood et al. |
| 5,778,216 | A | 7/1998 | Venkatesh |
| 7,743,355 | B2 | 6/2010 | Zhou et al. |
| 7,836,418 | B2 | 11/2010 | Binder et al. |
| 7,853,912 | B2 | 12/2010 | Binder et al. |
| 8,250,509 | B2 | 8/2012 | Daede et al. |
| 2005/0034091 | A1* | 2/2005 | Harn ................................ 716/6 |
| 2009/0288053 | A1* | 11/2009 | Brown et al. .................... 716/10 |
| 2010/0275168 | A1* | 10/2010 | Shibatani et al. ................ 716/2 |
| 2013/0145336 | A1* | 6/2013 | Iyer et al. ....................... 716/134 |
| 2013/0326455 | A1* | 12/2013 | Alpert et al. ................... 716/122 |

OTHER PUBLICATIONS

Acharya, Subrata, et al., "A Dynamic Slack Management Technique for Real-Time Distributed Embedded Systems", IEEE Trans. on Computers, v. 57, n. 2, pp. 215-230 (2008).

(Continued)

*Primary Examiner* — Vuthe Siek
(74) *Attorney, Agent, or Firm* — Steven L. Bennett; Jack V. Musgrove (57) ABSTRACT

Timing for a critical path of a circuit design is optimized by splitting up the path so the synthesis effort to solve the path is appropriately apportioned. Selected nodes of the path are made visible, and internal timing constraints are applied to gates at the visible nodes. The internal timing constraints are translated into physical locations, and placement constraints are applied to the gates based on the physical locations, followed by timing-driven placement. The internal timing constraints can be required arrival times computed using a linear delay model. The placement constraints can include an attractive force between a given one of the selected gates and a corresponding one of the physical locations. The results are better stability control from run to run, and significant savings in power consumption due to less buffering and better gate sizing, with an optimum partition of the path for better routing.

21 Claims, 7 Drawing Sheets

(56) References Cited

OTHER PUBLICATIONS

Kahng, Andrew B., et al., "Slack Redistribution for Graceful Degradation Under Voltage Overscaling", Proc. Asia and South Pacific Design Automation Conf., pp. 825-831 (2010).

Mahapatra, Rabi N., et al., "An Energy-Efficient Slack Distribution Technique for Multimode Distributed Real-Time Embedded Systems", IEEE Trans. on Parallel and Distributed Systems, v. 16, n. 7, pp. 650-662 (2005).

Mandal, Chittaranjan R., et al., "A Genetic Algorithm for the Synthesis of Structured Data Paths", Thirteenth Int'l Conf. on VLSI Design, pp. 206-211 (2000).

Tong, Shigiong, et al., "A Distributed Slack Bus Model and Its Impact on Distribution System Application Techniques", IEEE Int'l. Symposium on Circuits and Systems, v. 5, pp. 4743-4746 (2005).

Zimmermann, Reto, "Datapath Synthesis for Standard-Cell Design", IEEE Int'l. Symposium on Computer Arithmetic pp. 207-211 (2009).

\* cited by examiner

APPORTIONING SYNTHESIS EFFORT FOR BETTER TIMING CLOSURE

BACKGROUND OF THE INVENTION

1. Field of the Invention

The present invention generally relates to the design of integrated circuits, and more particularly to a method of achieving timing closure for an integrated circuit design or portion thereof.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn-around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs are ever larger and more gates need to be placed. There are also more chances for bad placements due to limited area resources.

SUMMARY OF THE INVENTION

The present invention is generally directed to a method of optimizing timing for a critical path of an integrated circuit design by receiving a description of the critical path including a path timing constraint for the critical path, identifying selected gates corresponding to certain nodes of the critical path, assigning internal timing constraints to the selected gates using the path timing constraint, translating the internal timing constraints into physical locations respectively associated with the selected gates, applying placement constraints to the selected gates based on the physical locations, and performing a timing-driven placement optimization of the critical path subject to the placement constraints. The nodes can be made visible by hardcoding a VHDL file for the integrated circuit design. The internal timing constraints can be computed based on current slack values for the path. In the illustrative implementation, the path timing constraint is a path required arrival time from a primary input of the critical path to a primary output of the critical path, and the internal timing constraints are internal required arrival times at the selected gates. The internal required arrival times can be computed using a linear delay model. The placement constraints can include an attractive force between one of the selected gates and a corresponding one of the physical locations. The attractive force can be implemented by applying a wirelength weight to the distance between the selected gate and the corresponding physical location which is greater than a normal wirelength weight for the timing-driven placement optimization.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
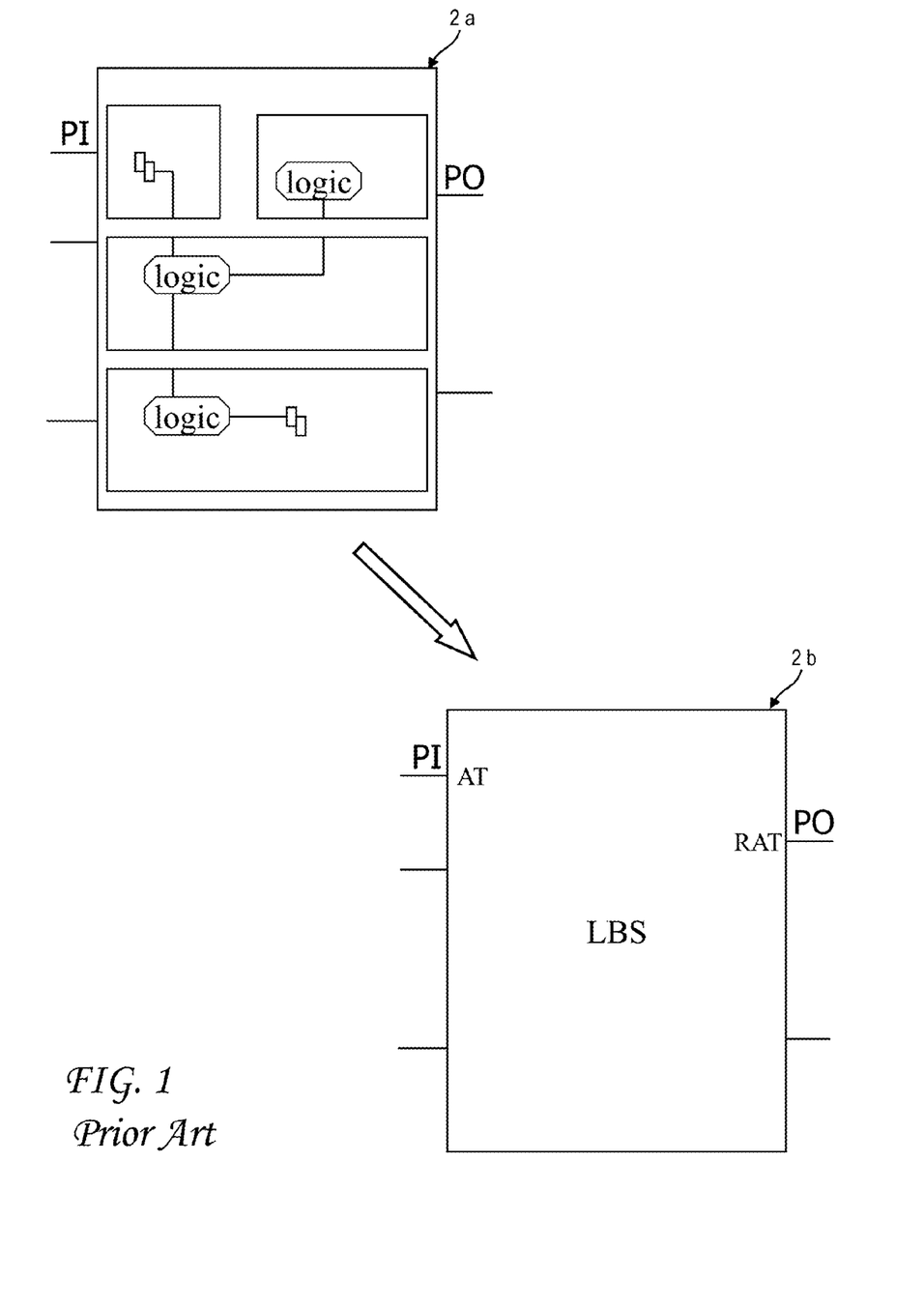
FIG. 1 is a pictorial representation of a simplified large block synthesis (LBS) circuit design wherein customs designs and random logic macros are conventionally merged into a single, flat, high-performance block with timing constraints applied at the boundaries, i.e., primary inputs and primary outputs.

Current microprocessor trends are integrating traditionally custom designs with random logic macros (RLMs) into very large integrated circuit designs. In some cases, entire microprocessor units are designed using an automated synthesis flow that integrates these traditional custom designs and RLMs into a single, flat design. This type of merged synthesis run is referred to as large block synthesis (LBS), and illustrated in FIG. 1. A group of logic circuits 2a have been designated for LBS. The circuits have a plurality of primary inputs (PIs) and primary outputs (POs). The circuits are merged into a single LBS block 2b which provides only boundary timing constraints, i.e., an arrival time (AT) at a PI, and a required arrival time (RAT) at a PO. The example of FIG. 1 is greatly simplified, as a typical LBS block might have more than 25,000 thousand cells and possibly as many as 500,000 cells.

Faster performance and predictability of responses are elements of interest in physical synthesis of circuit designs. As process technology scales to the deep and ultra-deep submicron regimes, circuit timing is becoming increasingly important to the performance and reliability of IC chips and systems. The high-performance nature of LBS designs makes physical synthesis quite challenging, particularly with regard to the issue of timing closure. Because the only timing assertion points are at the PIs/POs, a flat netlist posts a problem to synthesis on apportioning the effort needed to solve a timing critical path. Currently there is no means of distributing the cycle time across portions of a path, resulting in sub-optimal critical path optimization (a huge negative slack) due to a lack of balancing out timing requirements among multiple blocks. These problems are exacerbated for dataflow logics.

Figure 2:
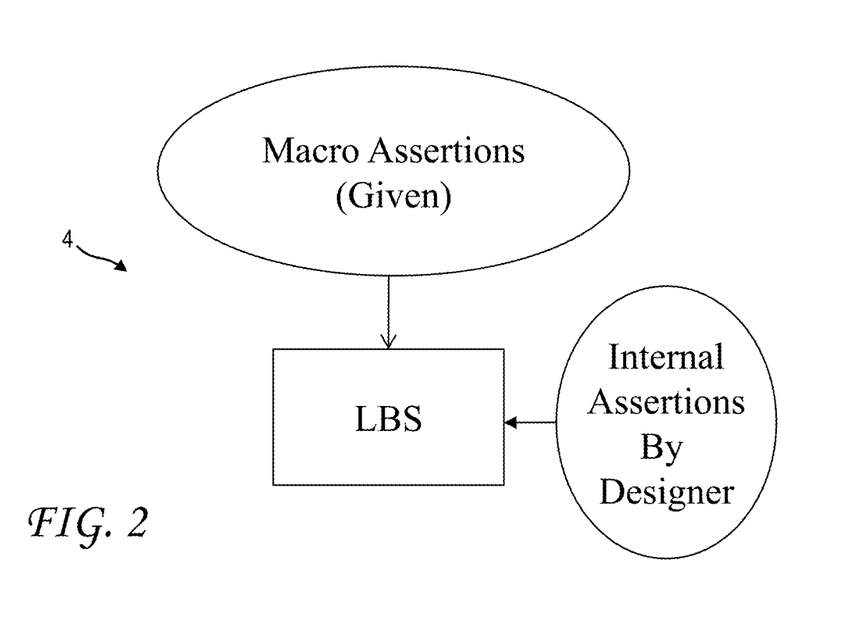
FIG. 2 is a chart illustrating how internal assertions for an LBS design can be provided in addition to given macro assertions in accordance with a generalized implementation of the present invention.
Figure 3:
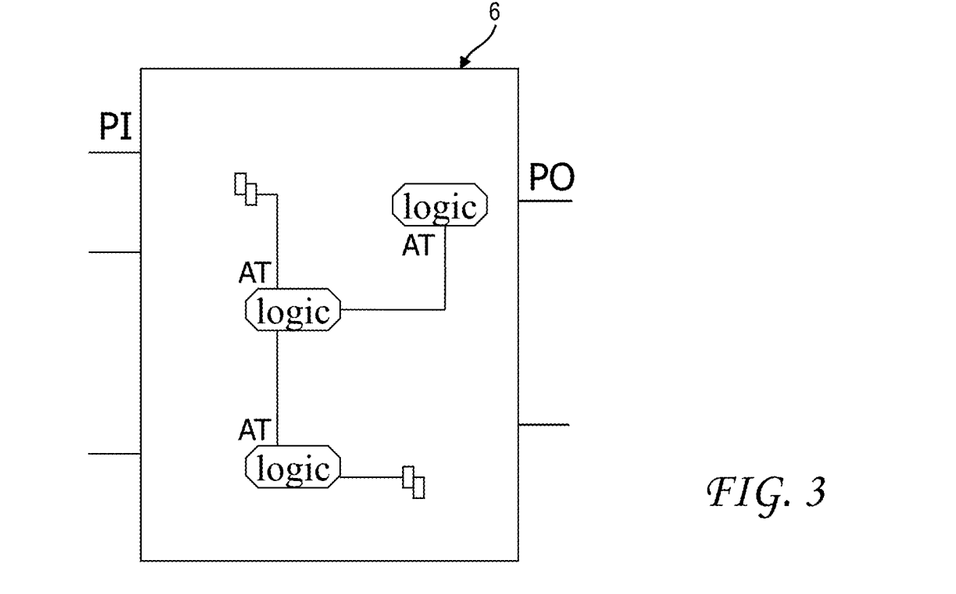
FIG. 3 is a pictorial representation of a simplified LBS design which has been assigned internal timing assertions in accordance with one implementation of the present invention.

In light of the foregoing it would be desirable to devise a method of splitting up the critical path for synthesis so that the effort applied to solve the path can be appropriately apportioned. It would be further advantageous if the method could help with convergence, i.e., obtain better stability control from run to run. The present invention achieves these objectives by dividing that path into interconnected regions of logic to be controlled for specific goals. In particular, selected gates of the critical path can be made visible, and timing constraints can be applied across the visible nodes to affect the downstream or upstream portions of the path. As seen in FIG. 2, the starting netlist for the LBS process includes various assertions for the macros or custom circuits within the design, but the present invention adds internal assertions based on the logic hierarchy and/or designer's intuition. A difficult critical path requires the designer to understand the path and its feeding cone of logic so that the nodes of the critical sections of the path can be made visible initially. Creating visibility can be accomplished in various ways, for example, No Mod (designating no modifications are to be made to the cell), soft structured blocks, or hardcoding a VHDL file for the design to specify the selected nodes. Once nodes are visible, the designer can assert RAT/AT constraints in order to partition the effort needed by synthesis. For example, FIG. 3 shows an LBS block 6 having three nodes which have been made visible, with arrival times assigned at each of these nodes. Arrival times can be obtained by cross-section or user input to determine the amount of effort needed. Cross section is a technique by which the designer can simulate a critical path (e.g., via SPICE) to get arrival times at any point. Any number of arrival times can be inserted. Thereafter, the designer can assert placement guidelines of various strengths in order to avoid wire delays and buffering, e.g., movebounds, fixed locations, block point attractions, net weights, routing priorities, etc. The result is a savings in power consumption via less buffering and better gate sizing, and an optimum partition of the path for better routing.

Figure 4:
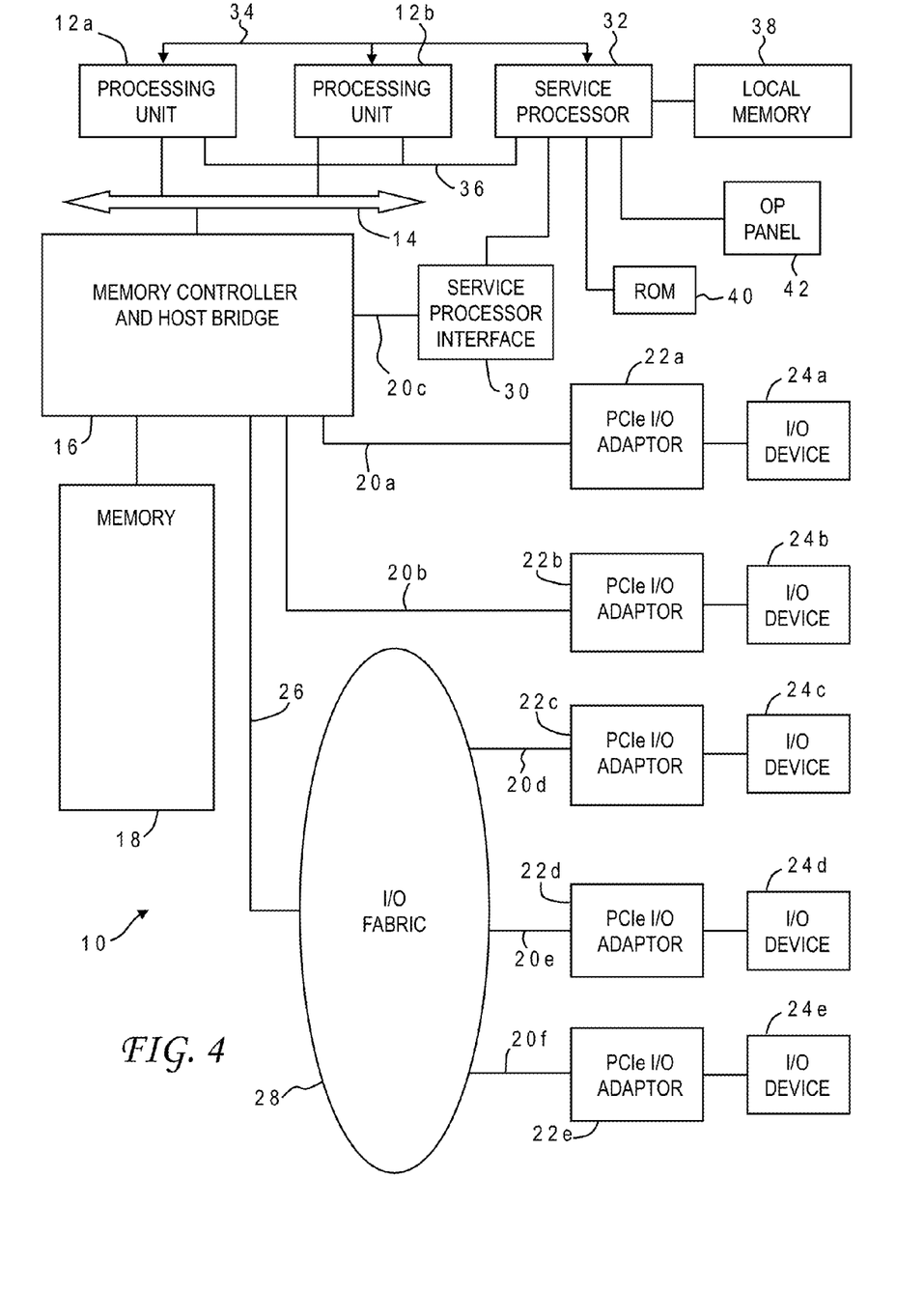
FIG. 4 is a block diagram of a computer system programmed to carry out the design of integrated circuits in accordance with one implementation of the present invention.

With further reference to FIG. 4, there is depicted one embodiment 10 of a computer system in which the present invention may be implemented to carry out the design of logic structures in an integrated circuit. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a circuit design process that uses novel timing assertion techniques to manage placement of circuit components. Accordingly, a program embodying the invention may include conventional aspects of various placement tools, and these details will become apparent to those skilled in the art upon reference to this disclosure.

Figure 5:
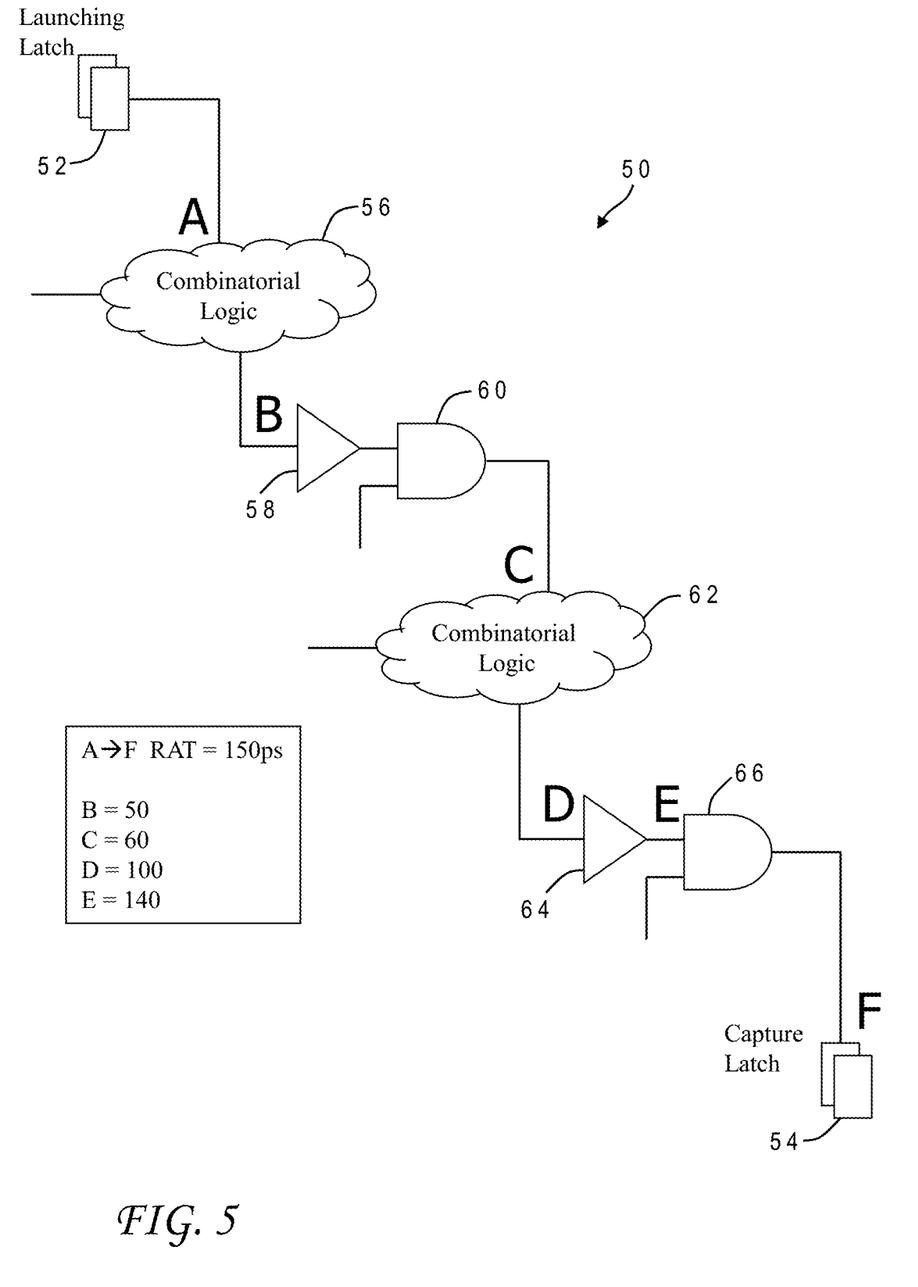
FIG. 5 is a high-level schematic diagram showing how nodes of an exemplary circuit path of an LBS design are made visible to allow apportioning of the synthesis effort in accordance with one implementation of the present invention.

Referring now to FIG. 5, there is depicted a selected path 50 of a circuit design which has been designated as critical by the designer or by automated decision making according to design rules. Path 50 begins with a launching latch 52, and ends with a capture latch 54. Latch 52 may be an input boundary latch receiving its signal from a primary input, and latch 54 may be an output boundary latch passing its signal to a primary output. Path 50 has been broken into a plurality of path segments by making certain nodes of the path visible. In this example, there is a first node A at a first set of combinatorial logic 56 which receives the signal from launching latch 52; there is a second node B at a gate (buffer) 58 which follows combinatorial logic 56 and feeds an AND gate 60; there is a third node C at a second set of combinatorial logic 62 which receives the signal from AND gate 60; there is a fourth node D at a gate (buffer) 64 which follows combinatorial logic 62 and feeds an AND gate 66; and there is a sixth, final node F at capture latch 54 which receives the signal from AND gate 66. It is not necessary to make every node on the path visible, i.e., the selected nodes may be a smaller subset of all nodes; in this example the AND gate 60 between nodes B and C is not made visible.

The synthesis effort for placing circuit 50 can be apportioned by applying RAT constraints at the visible nodes as desired to guide relative placement of the regions along the path and achieve path wiring and buffering goals. If the path from node A to node F has a RAT of 150 picoseconds, the following intermediate RATs may be applied to the internal nodes: node B, 50 picoseconds; node C, 60 picoseconds; node D, 100 picoseconds; and node E, 140 picoseconds. In this example, the designer has deemed the segment from node B to node C as being particularly critical (far more than the other segments) since it has only a 10 picosecond delay, so the synthesis tools will work on that section harder than rest. The result is movement of the cell closer to the overridden RAT point. Those skilled in the art will again appreciate that FIG. 5 is simplified, and the critical path may have dozens or even hundreds of internal nodes which are made visible.

Figure 6A:
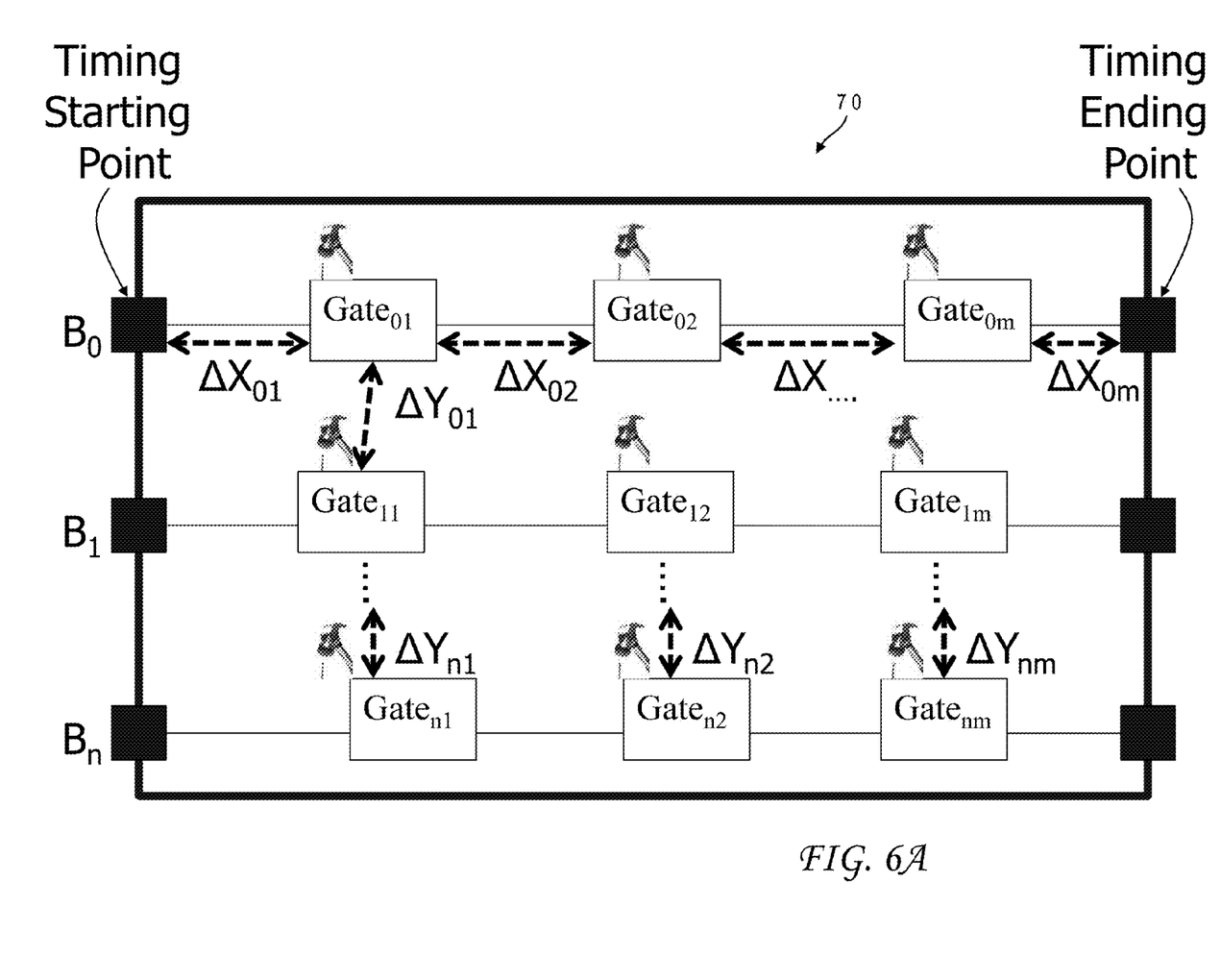
FIGS. 6A and 6B are high-level schematic diagrams depicting bus (multi-bit) paths which are assigned internal timing constraints that are translated into physical locations used with placement constraints on the visible nodes during timing-driven placement optimization in accordance with one implementation of the present invention.

Different approaches may be employed to optimize cell placement based on the internally assigned RAT constraints. In the exemplary implementation, the RATs are translated into physical locations, and block point attractions are applied between these physical locations and respective gates. This approach is particularly beneficial in the placement of two-dimensional (2D) multi-bit slice datapaths. A datapath is a portion of a circuit that transmits the data signals which are the primary function of the circuit, as opposed to random logic or clock networks which are used to support the datapaths. For example, FIG. 6A depicts multi-bit paths for the starting design 70 of a bus circuit having a plurality of bits $B_0$, $B_1, \ldots, B_n$. Each path has an overall timing constraint, i.e., RAT from the timing starting point to the timing ending point. For a path of an interest, RATs of internal gates along the path are determined. The RATs can be assigned by the designer based on experience or can be automatically computed based on current slack values for the design, and can then be adjusted by the designer as desired. In a simpler embodiment the same amount of delay is applied to each stage, for example, if there are five stages of logic from the starting point to ending point, simply divide the overall preferred delay (from A to F) by the number of stages (five). If a designer made several runs of synthesis on the design, she may empirically know which stages of logics are more critical than other stages, in which case the designer can apportion slacks (or expected delay) accordingly. Designer "preferred" slack values can be assigned to the stages to guide the synthesis process toward the designer's intention.

According to this "nail-down" approach, each gate in the path is then associated with a physical location in the design layout based on the internal RATs, the idea being that each gate will be pulled toward its preferred spot during placement while allowing some flexibility to move the gate nearby. Optimal buffering can be used to compute an ideal location for each gate, i.e., a linear delay model embodied as a table for delay in a library file wherein any delay between two RATs is calculated by a linear curve fit. The distances between the ideal locations (for the $B_0$ path: $\Delta X_{01}, \Delta X_{02}, \ldots, \Delta X_{0m}$) thus correspond to delays that will add up (at most) to the PI/PO timing constraint for the path. If a given cell is in location <X,Y> the next cell is offset by $\Delta X$ and $\Delta Y$, and so forth. These physical locations become attraction points (represented by the hammer-nail icons in FIG. 6A) for the gates during timing-driven placement. Timing-driven placement is known in the art, and basically places the Boolean gates while keeping timing in mind, i.e., what is the shortest possible time you can get from point A to point B with a given arrival time.

Figure 6B:
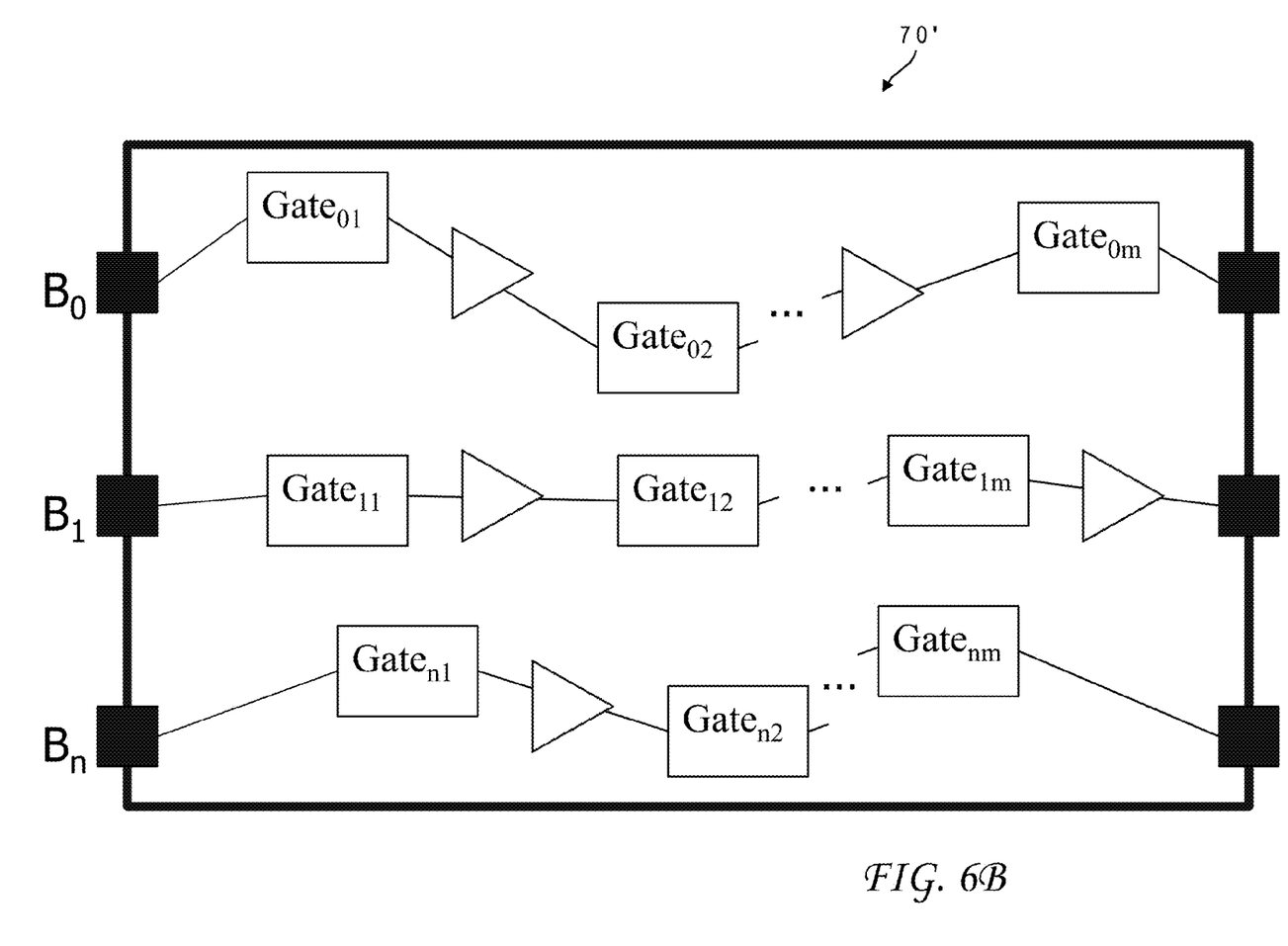

FIG. 6B shows how the resulting placement 70' (with buffers inserted) allows the gates to move within the 2D layout while still remaining relatively close to the respective attraction points, to achieve alignment of timing across different bit slices.

In an exemplary embodiment the attractions are implemented by applying a wirelength weight to the distance between a gate and its corresponding attraction point which is 500 times the normal wirelength weight for the placer. Other placement constraints may be applied to the gates using the identified physical locations. For example, a movebounds may be applied to the gate (e.g., a diamond or square shape centered on the physical location), or the gate may actually be fixed at the location.

Figure 7:
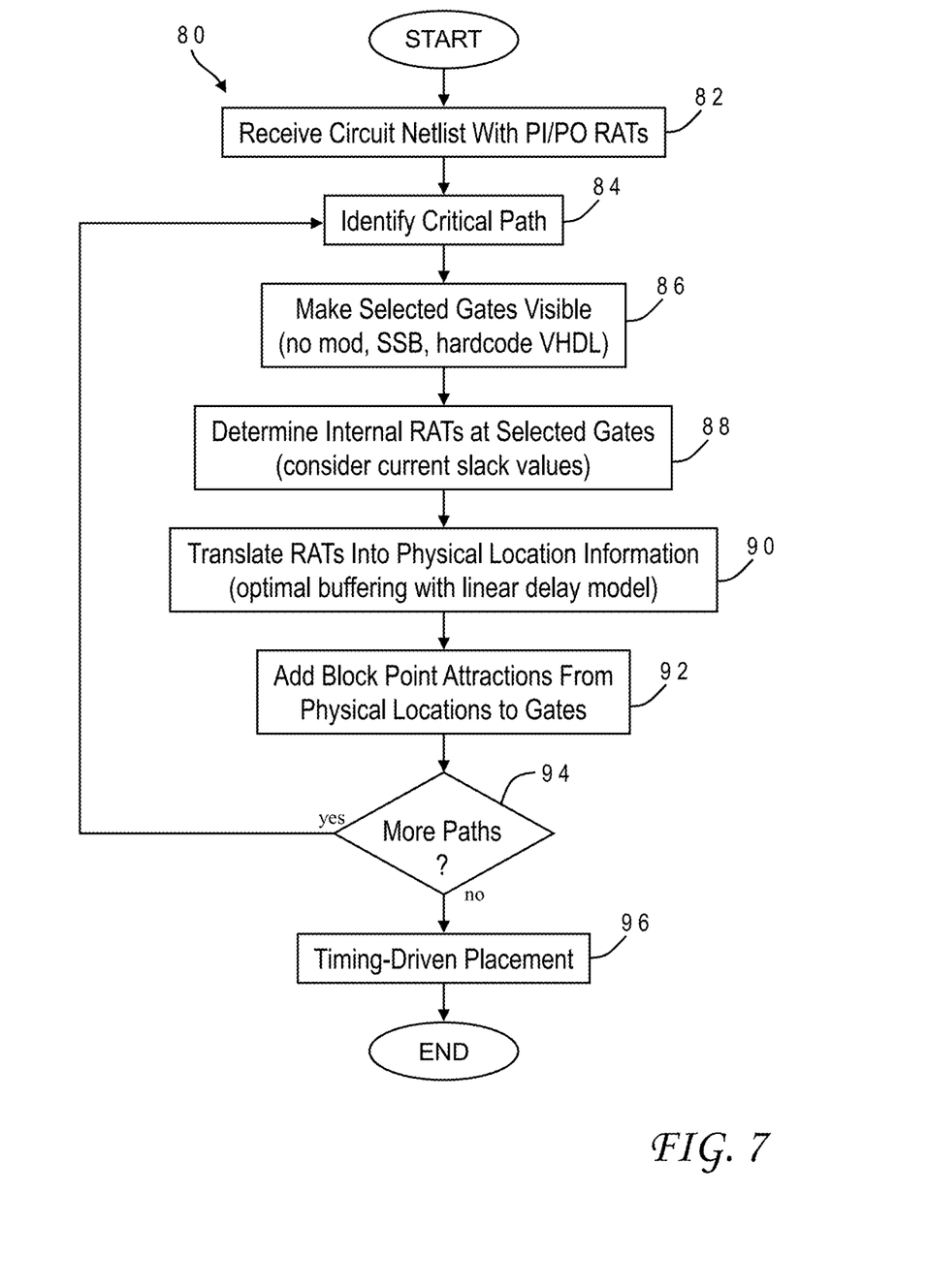
FIG. 7 is a chart illustrating the logical flow for an optimized placement process in accordance with one implementation of the present invention.

The invention may be further understood with reference to the chart of FIG. 7 which illustrates the logical flow for an optimized placement process 80 in accordance with one implementation which may be carried out by computer system 10. Process 80 begins when the optimization program receives a netlist or other description of the circuit which includes global timing constraints (PI/PO RATs) 82. A critical path of the circuit is identified 84, and selected gates along this path are made visible 86, i.e., the path is segmented. Internal RATs are assigned at the selected gates 88 to apportion the synthesis effort. The RATs are used to compute the physical location information for the attraction points 90, and block point attractions between a gate and its preferred location are added to the netlist 92. These steps are repeated for each critical path identified 94, and then timing-driven placement is carried out for the circuit subject to the added gate attractions.

The present invention thereby allows a designer to enhance the placement process by directly inserting timing assertions within a design in a manner that can be integrated with existing physical design optimization methods. This superior control guarantees that a designer's intention is implemented, unlike the indirect prior art methods. The designer can control the formation and optimization of a complete logic path within the context of a larger overall design, wherein the specific logic path requires controls to achieve desired physical implementation and those controls would be inappropriate if applied to the entire overall design. The novel approach of the present invention is particularly advantageous for datapath flow synthesis, resulting in better distribution of timing (slacks) so that timing can evenly optimized, potential power savings with less buffering and gate sizing, and better stability control from run to run, for a higher fidelity between logic and physical synthesis.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been disclosed in the context of a flat (2D) layout, but it is equally application to a 3D design. It is therefore contemplated that such modifications can be made without departing from the spirit or scope of the present invention as defined in the appended claims.

What is claimed is:

1. A method of optimizing timing for a critical path of an integrated circuit design comprising:
   receiving a description of the critical path including a path timing constraint for the critical path, the critical path having a plurality of nodes, by executing first instructions in a computer system;
   identifying selected gates corresponding to certain nodes of the critical path, by executing second instructions in the computer system;
   assigning internal timing constraints to the selected gates using the path timing constraint, by executing third instructions in the computer system;
   translating the internal timing constraints into physical locations respectively associated with the selected gates, by executing fourth instructions in the computer system;
   applying placement constraints to the selected gates based on the physical locations, by executing fifth instructions in the computer system; and
   performing a timing-driven placement optimization of the critical path subject to the placement constraints, by executing sixth instructions in the computer system.

2. The method of claim 1 wherein said identifying includes hardcoding a VHDL file for the integrated circuit design to specify the selected gates.

3. The method of claim 1 wherein the internal timing constraints are computed based on current slack values for the path.

4. The method of claim 1 wherein the path timing constraint is a path required arrival time from a primary input of the critical path to a primary output of the critical path, and the internal timing constraints are internal required arrival times at the selected gates.

5. The method of claim 4 wherein the internal required arrival times are computed using a linear delay model.

6. The method of claim 1 wherein the placement constraints include an attractive force between one of the selected gates and a corresponding one of the physical locations.

7. The method of claim 6 wherein the attractive force is implemented by applying a wirelength weight to the distance between the selected gate and the corresponding physical location which is greater than a normal wirelength weight for the timing-driven placement optimization.

8. A computer system comprising:
   one or more processors which process program instructions;
   a memory device connected to said one or more processors; and
   program instructions residing in said memory device for optimizing timing of a critical path of an integrated circuit design by receiving a description of the critical path including a path timing constraint for the critical path, the critical path having a plurality of nodes, identifying selected gates corresponding to certain nodes of the critical path assigning internal timing constraints to the selected gates using the path timing constraint, translating the internal timing constraints into physical locations respectively associated with the selected gates, applying placement constraints to the selected gates based on the physical locations, and performing a timing-driven placement optimization of the critical path subject to the placement constraints.

9. The computer system of claim 8 wherein the identifying includes hardcoding a VHDL file for the integrated circuit design to specify the selected gates.

10. The computer system of claim 8 wherein the internal timing constraints are computed based on current slack values for the path.

11. The computer system of claim 8 wherein the path timing constraint is a path required arrival time from a primary input of the critical path to a primary output of the critical path, and the internal timing constraints are internal required arrival times at the selected gates.

12. The computer system of claim 11 wherein the internal required arrival times are computed using a linear delay model.

13. The computer system of claim 8 wherein the placement constraints include an attractive force between one of the selected gates and a corresponding one of the physical locations.

14. The computer system of claim 13 wherein the attractive force is implemented by applying a wirelength weight to the distance between the selected gate and the corresponding physical location which is greater than a normal wirelength weight for the timing-driven placement optimization.

15. A computer program product comprising:
a computer readable storage medium; and
program instructions residing in said storage medium for optimizing timing of a description of the critical path including a critical path of an integrated circuit design by receiving a path timing constraint for the critical path, the critical path having a plurality of nodes, identifying selected gates corresponding to certain nodes of the critical path assigning internal timing constraints to the selected gates using the path timing constraint, translating the internal timing constraints into physical locations respectively associated with the selected gates, applying placement constraints to the selected gates based on the physical locations, and performing a timing-driven placement optimization of the critical path subject to the placement constraints.

16. The computer program product of claim 15 wherein the identifying includes hardcoding a VHDL file for the integrated circuit design to specify the selected gates.

17. The computer program product of claim 15 wherein the internal timing constraints are computed based on current slack values for the path.

18. The computer program product of claim 15 wherein the path timing constraint is a path required arrival time from a primary input of the critical path to a primary output of the critical path, and the internal timing constraints are internal required arrival times at the selected gates.

19. The computer program product of claim 18 wherein the internal required arrival times are computed using a linear delay model.

20. The computer program product of claim 15 wherein the placement constraints include an attractive force between one of the selected gates and a corresponding one of the physical locations.

21. The computer program product of claim 20 wherein the attractive force is implemented by applying a wirelength weight to the distance between the selected gate and the corresponding physical location which is greater than a normal wirelength weight for the timing-driven placement optimization.

\* \* \* \* \*